US012581020B2

(12) United States Patent
Nagai

(10) Patent No.: US 12,581,020 B2
(45) Date of Patent: Mar. 17, 2026

(54) ELECTRONIC APPARATUS AND COMMUNICATION APPARATUS

(71) Applicant: CANON KABUSHIKI KAISHA, Tokyo (JP)

(72) Inventor: Keita Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/624,437

(22) Filed: Apr. 2, 2024

(65) Prior Publication Data

US 2024/0340527 A1 Oct. 10, 2024

(30) Foreign Application Priority Data

Apr. 4, 2023 (JP) ................................. 2023-060832

(51) Int. Cl.
| | |
|---|---|
| *H04N 1/00* | (2006.01) |
| *H04N 23/65* | (2023.01) |
| *H04N 23/667* | (2023.01) |
| *H04N 101/00* | (2006.01) |

(52) U.S. Cl.
CPC ....... *H04N 1/00119* (2013.01); *H04N 23/651* (2023.01); *H04N 23/667* (2023.01); *H04N 2101/00* (2013.01); *H04N 2201/3261* (2013.01)

(58) Field of Classification Search
CPC ............. H04N 1/00119; H04N 23/651; H04N 23/667; H04N 2201/3261
See application file for complete search history.

(56) References Cited

U.S. PATENT DOCUMENTS

| | | | | |
|---|---|---|---|---|
| 2006/0133795 | A1* | 6/2006 | Terai | ........................ G06F 3/038 |
| 2019/0104557 | A1* | 4/2019 | Fujita | .................... H04W 88/04 |
| 2021/0385575 | A1* | 12/2021 | Meiyappan | ............. G06F 3/165 |

OTHER PUBLICATIONS

Nick Hunn, Introducing Bluetooth LE Audio, p. 277-294, Jan. 2022.

* cited by examiner

*Primary Examiner* — Daniel M Pasiewicz
(74) *Attorney, Agent, or Firm* — Cowan, Liebowitz & Latman, P.C.

(57) ABSTRACT

An electronic apparatus comprises a sound reception unit that receives sound data from a sound transmission device by a wireless communication unit, a sound transmission unit that transmits sound data to a sound reception device by a wireless communication unit, and a control unit that switches, in accordance with an operation state of the electronic apparatus, between a first operation of receiving the sound data from the sound transmission device and transmitting the sound data to the sound reception device by the sound transmission unit and a second operation in which the sound reception device receives the sound data from the sound transmission device.

11 Claims, 8 Drawing Sheets

F I G. 2A
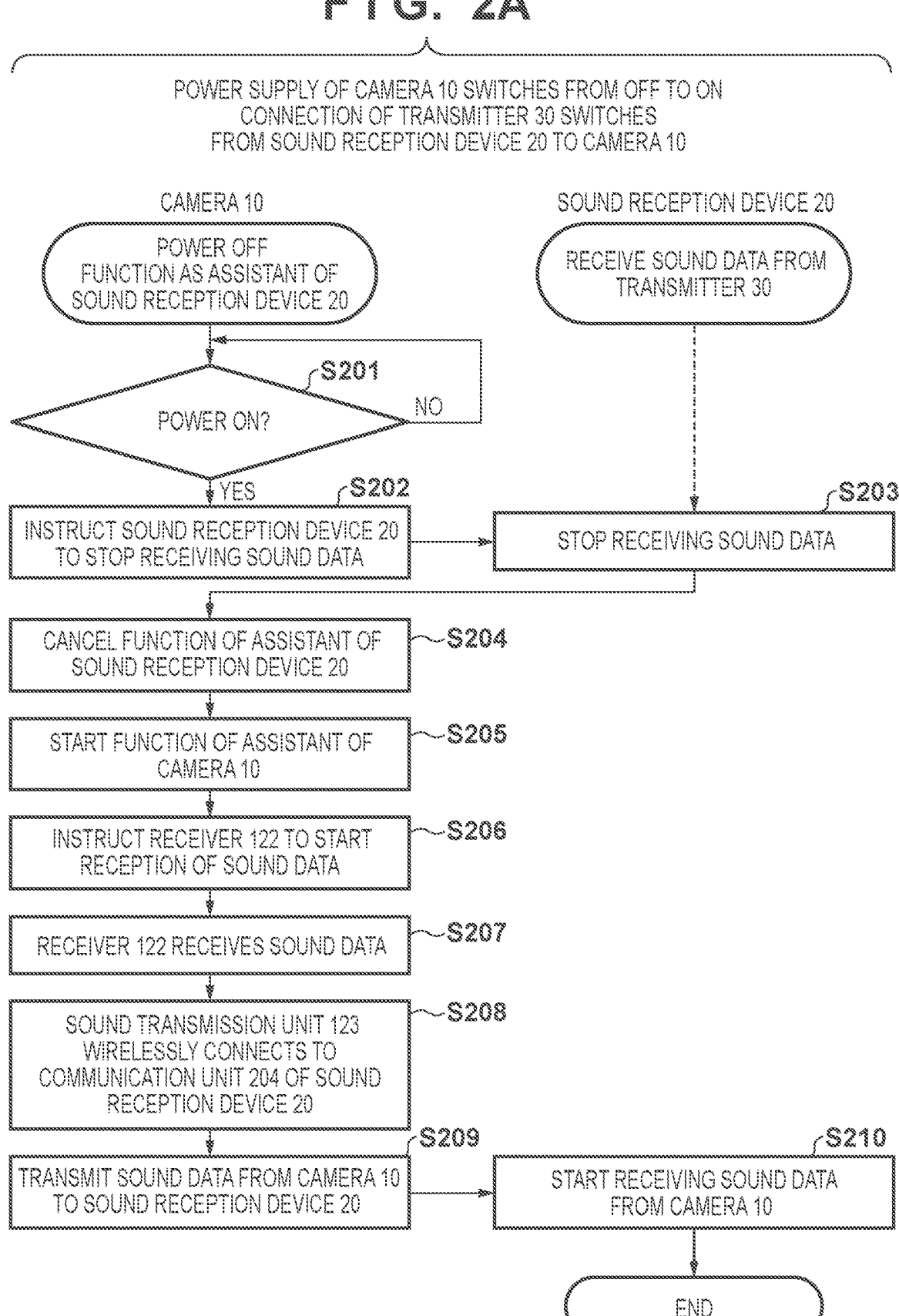

FIG. 2B

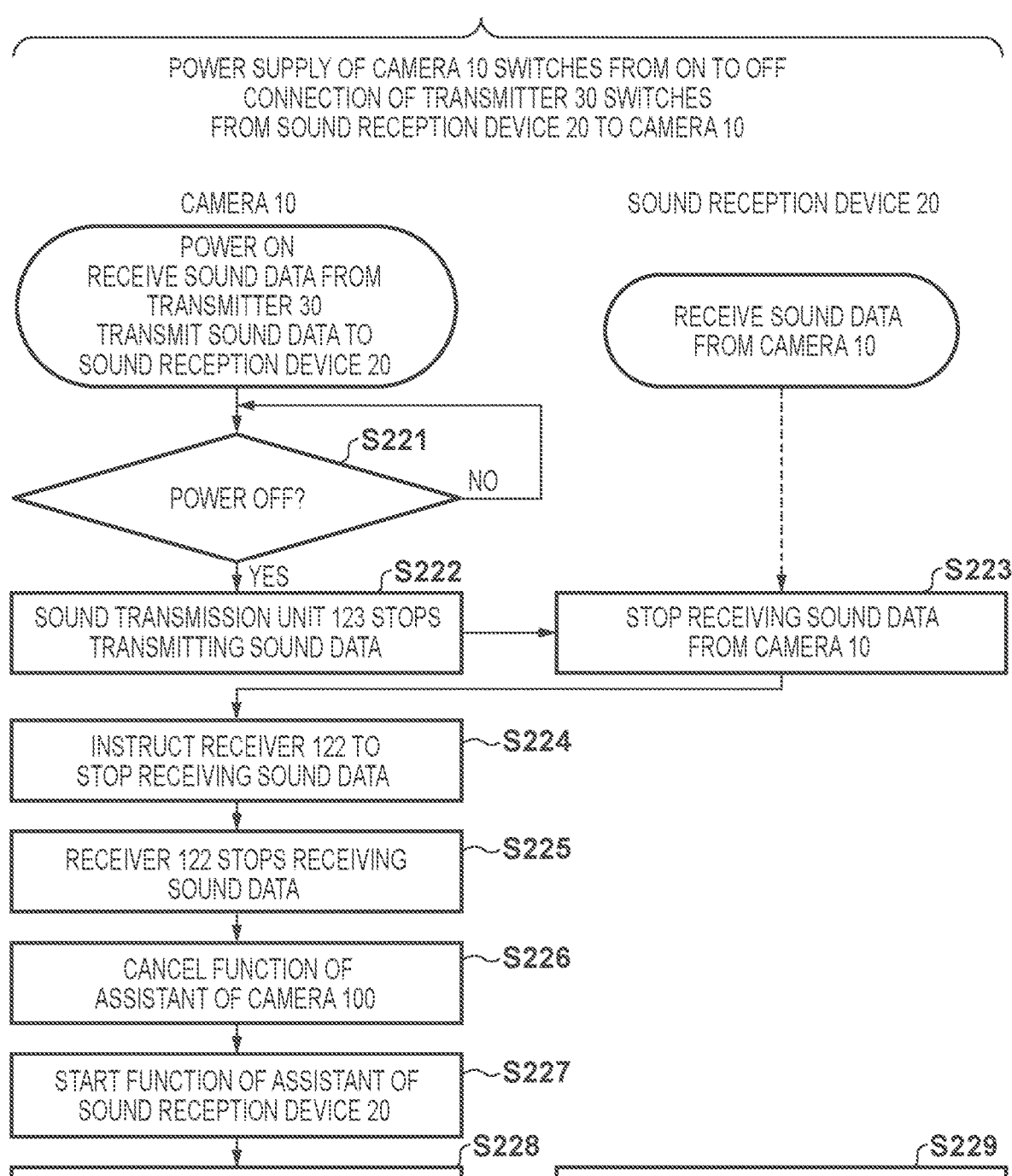

POWER SUPPLY OF CAMERA 10 SWITCHES FROM ON TO OFF
CONNECTION OF TRANSMITTER 30 SWITCHES
FROM SOUND RECEPTION DEVICE 20 TO CAMERA 10

CAMERA 10

SOUND RECEPTION DEVICE 20

POWER ON
RECEIVE SOUND DATA FROM
TRANSMITTER 30
TRANSMIT SOUND DATA TO
SOUND RECEPTION DEVICE 20

RECEIVE SOUND DATA
FROM CAMERA 10

S221
POWER OFF?    NO

YES    S222
SOUND TRANSMISSION UNIT 123 STOPS
TRANSMITTING SOUND DATA

S223
STOP RECEIVING SOUND DATA
FROM CAMERA 10

S224
INSTRUCT RECEIVER 122 TO
STOP RECEIVING SOUND DATA

S225
RECEIVER 122 STOPS RECEIVING
SOUND DATA

S226
CANCEL FUNCTION OF
ASSISTANT OF CAMERA 100

S227
START FUNCTION OF ASSISTANT OF
SOUND RECEPTION DEVICE 20

S228
INSTRUCT SOUND RECEPTION DEVICE 20
TO START RECEIVING SOUND DATA

S229
START RECEIVING SOUND DATA
FROM TRANSMITTER 30

END

F I G. 3A
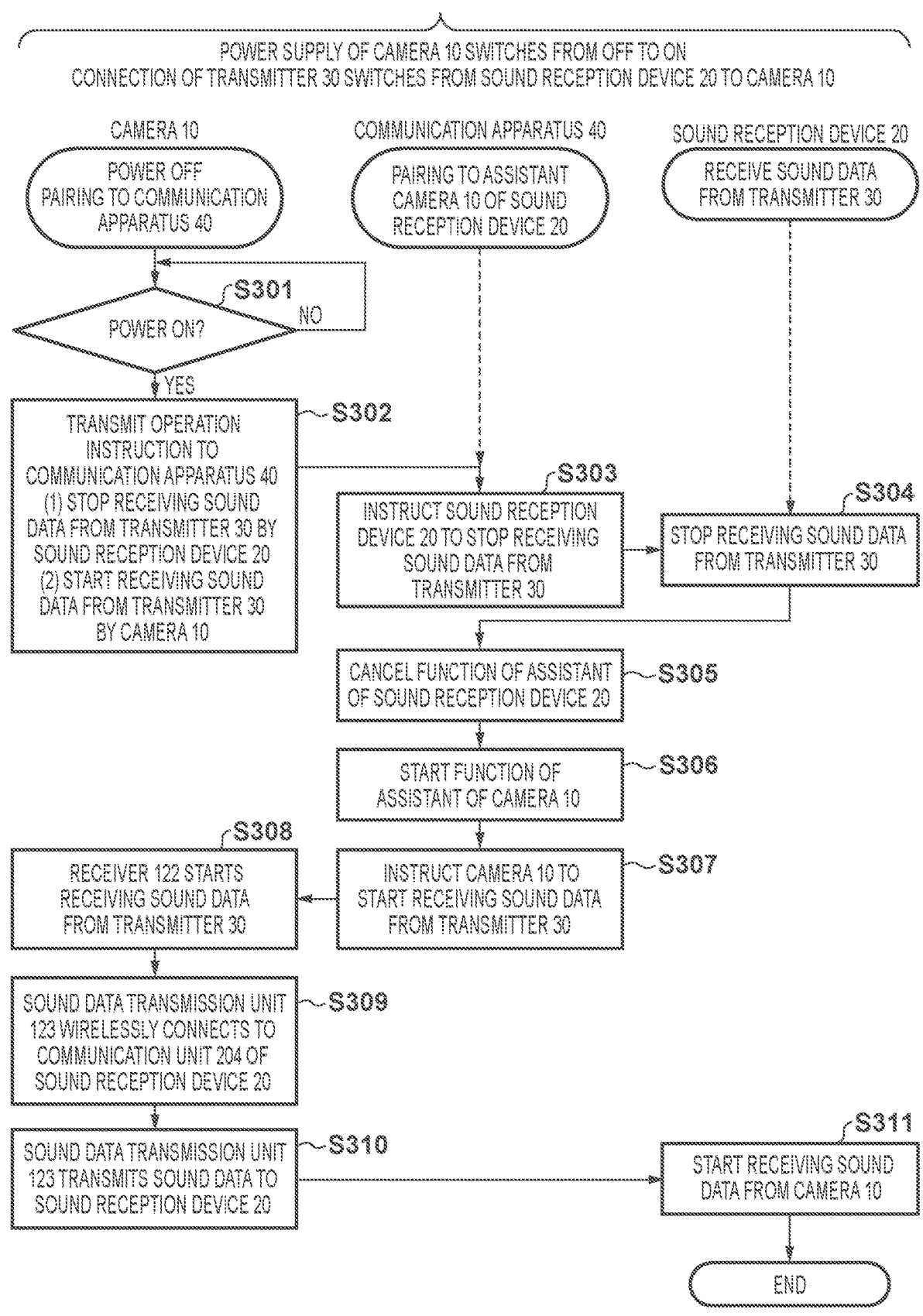

F I G. 3B
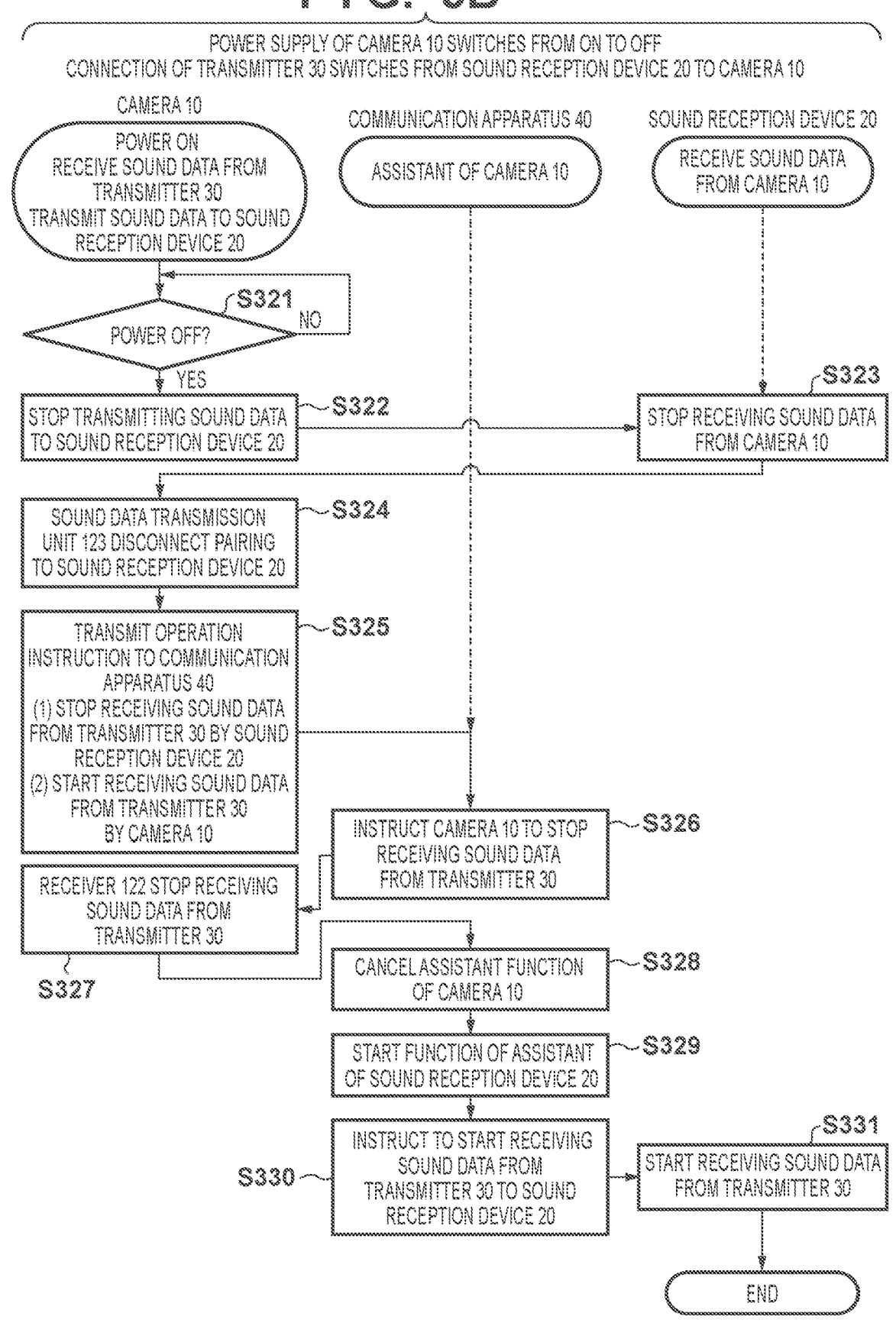

F I G. 4A
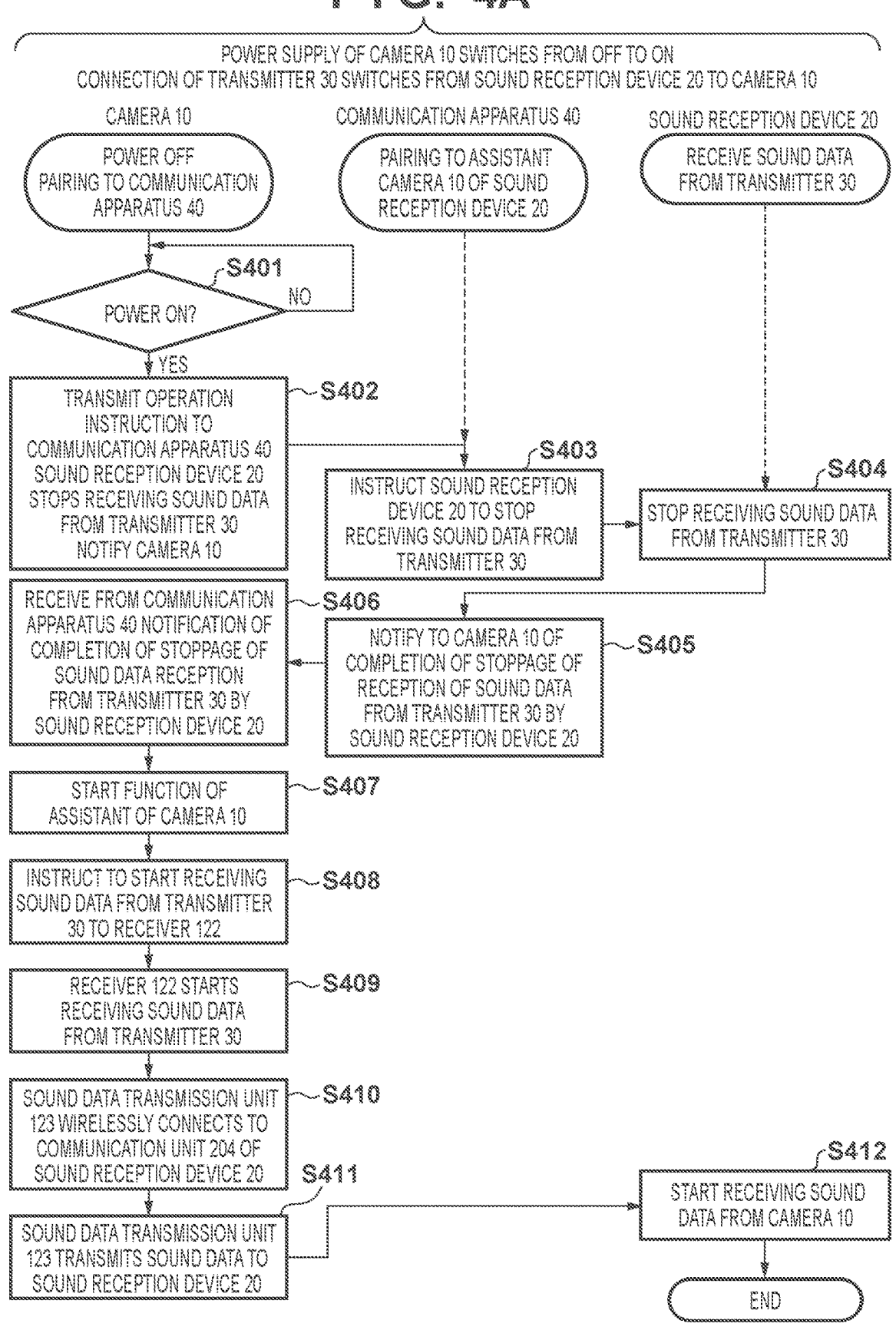

F I G. 4B
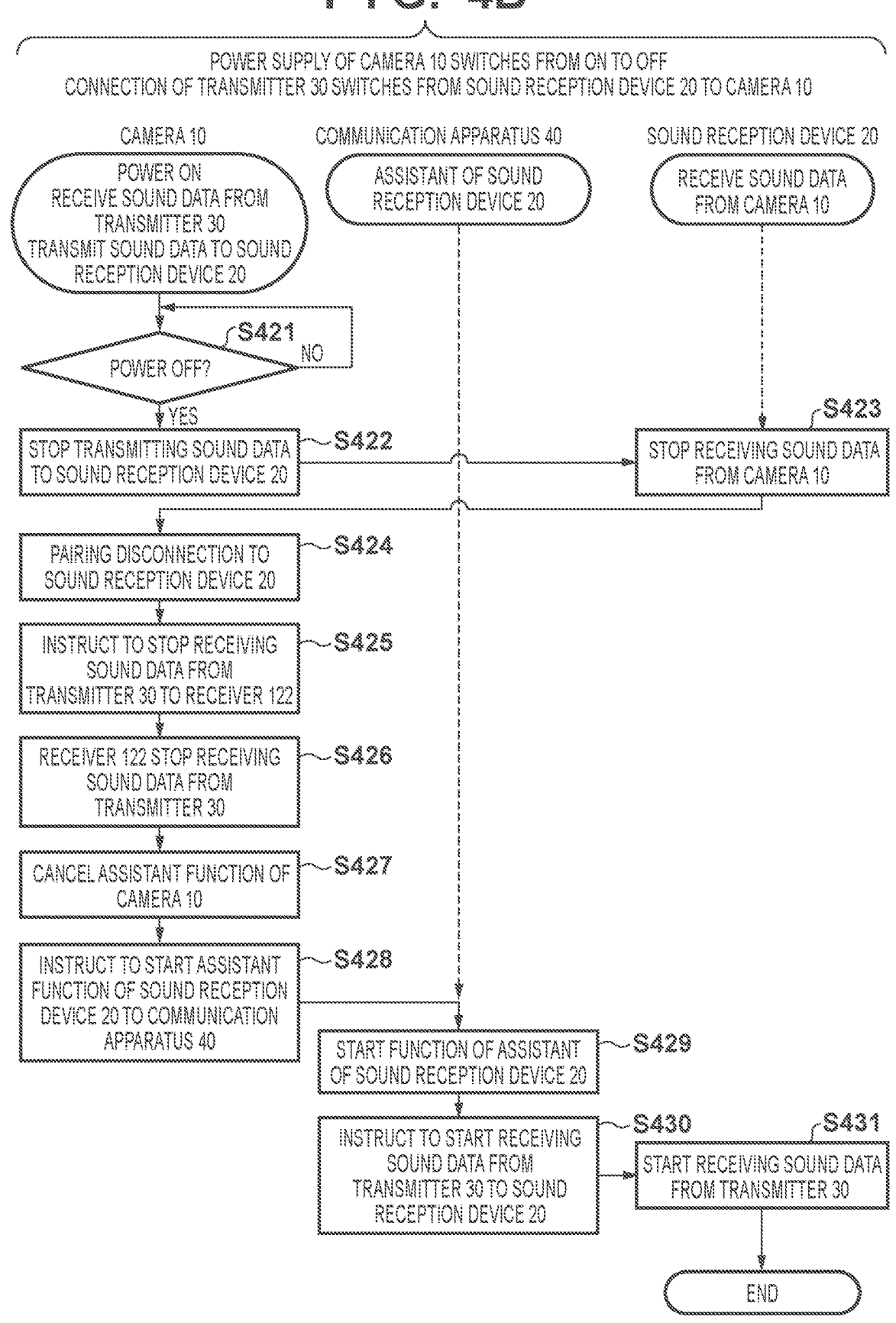

ELECTRONIC APPARATUS AND COMMUNICATION APPARATUS

BACKGROUND OF THE INVENTION

Field of the Invention

The present invention relates to a system capable of receiving sound data from a plurality of transmission devices.

Description of the Related Art

AURACAST® broadcast audio is a function of transmitting sound data from a single device such as s smartphone or a tablet to a plurality of user terminals and allowing a plurality of users to listen to the sound data received from the one device.

AURACAST® broadcast audio includes an AURACAST® Transmitter (to be referred to as a transmitter hereinafter), an AURACAST® Assistant (to be referred to as an assistant hereinafter), and an AURACAST® Receiver (to be referred to as a receiver hereinafter). The assistant scans advertisements broadcast from transmitters, and a user selects a desired transmitter from the scan result. The receiver receives sound data transmitted from the selected transmitter (Nick Hunn, "Introducing Bluetooth LE Audio", p. 277-294).

As assumed use cases of AURACAST® broadcast audio, a video on a monitor installed in a public area is viewed with sound, or an announcement in an airport or a station is directly received by a user terminal.

When a user terminal is a camera that shoots a still image or a moving image, and it shoots a moving image of a subject in a place apart from the photographer or a subject through glass, a microphone incorporated in the camera cannot collect sound around the subject. However, when a microphone and a transmitter are placed near the subject, and sound data transmitted from the transmitter is received by the camera, it is possible to shoot a high presence moving image with sound. As such a use case, for example, a theme park such as a zoo or an aquarium or an event such as a recital or an athletic meet is assumed.

In the above-described example, it can be considered that the photographer shoots a moving image while receiving sound data of a subject as a shooting target from a transmitter, or collects sound data on the periphery of the photographer using a microphone incorporated in a camera and combines it with sound data received from a transmitter, or receives sound data from a transmitter using an earphone connected to a camera and listens to it.

As described above, as an assumed use case when a camera and an earphone are wirelessly connected and the camera or the earphone receives sound data from a transmitter, when the camera is used, moving image shooting is performed while receiving the sound of a subject as a shooting target by the camera, and when the camera is not used, the sound of an object that can be a subject is received by the earphone. In a case where the camera is not used, sound is received not by the camera but by the earphone to reduce power consumption of the camera.

However, every time the camera is powered on or off, the user needs to operate the camera or the earphone to switch connection of the transmitter, and there is room for improvement of operability.

SUMMARY OF THE INVENTION

The present invention has been made in consideration of the aforementioned problems, and realizes techniques capable of improving operability when switching connection of a sound transmission device.

In order to solve the aforementioned problems, the present invention provides an electronic apparatus comprising: a sound reception unit that receives sound data from a sound transmission device by a wireless communication unit; a sound transmission unit that transmits sound data to a sound reception device by a wireless communication unit; and a control unit that switches, in accordance with an operation state of the electronic apparatus, between a first operation of receiving the sound data from the sound transmission device and transmitting the sound data to the sound reception device by the sound transmission unit and a second operation in which the sound reception device receives the sound data from the sound transmission device.

In order to solve the aforementioned problems, the present invention provides a communication apparatus which communicates with an electronic apparatus and a sound reception device, wherein the electronic apparatus comprises: a sound reception unit that receives sound data from a sound transmission device by a wireless communication unit; and a sound transmission unit that transmits sound data to a sound reception device by a wireless communication unit, and wherein the communication apparatus comprises a control unit that switches between a first operation in which the electronic apparatus receives the sound data from the sound transmission device, and the sound data is transmitted to the sound reception device by the sound transmission unit and a second operation in which the sound reception device receives the sound data from the sound transmission device, and the control unit receives, from the electronic apparatus, information indicating an operation state of the electronic apparatus and switches between the first operation and the second operation.

In order to solve the aforementioned problems, the present invention provides a communication apparatus which communicates with an electronic apparatus and a sound reception device, wherein the electronic apparatus comprises: a sound reception unit that receives sound data from a sound transmission device by a wireless communication unit; a sound transmission unit that transmits sound data to a sound reception device by a wireless communication unit; and a control unit that controls a first operation in which the electronic apparatus receives the sound data from the sound transmission device, and the sound data is transmitted to the sound reception device by the sound transmission unit, and wherein the communication apparatus comprises a control unit that controls a second operation in which the sound reception device receives the sound data from the sound transmission device, and the control unit of the communication apparatus controls the second operation in accordance with an instruction, from the electronic apparatus, to switch between the first operation and the second operation.

According to the present invention, it is possible to improve operability when switching connection of a sound transmission device.

Further features of the present invention will become apparent from the following description of exemplary embodiments (with reference to the attached drawings).

BRIEF DESCRIPTION OF THE DRAWINGS

FIGS. 2A and 2B are flowcharts showing control processing according to the first embodiment;

FIGS. 3A and 3B are flowcharts showing control processing according to the second embodiment;

FIGS. 4A and 4B are flowcharts showing control processing according to the third embodiment.

DESCRIPTION OF THE EMBODIMENTS

Figure 1:
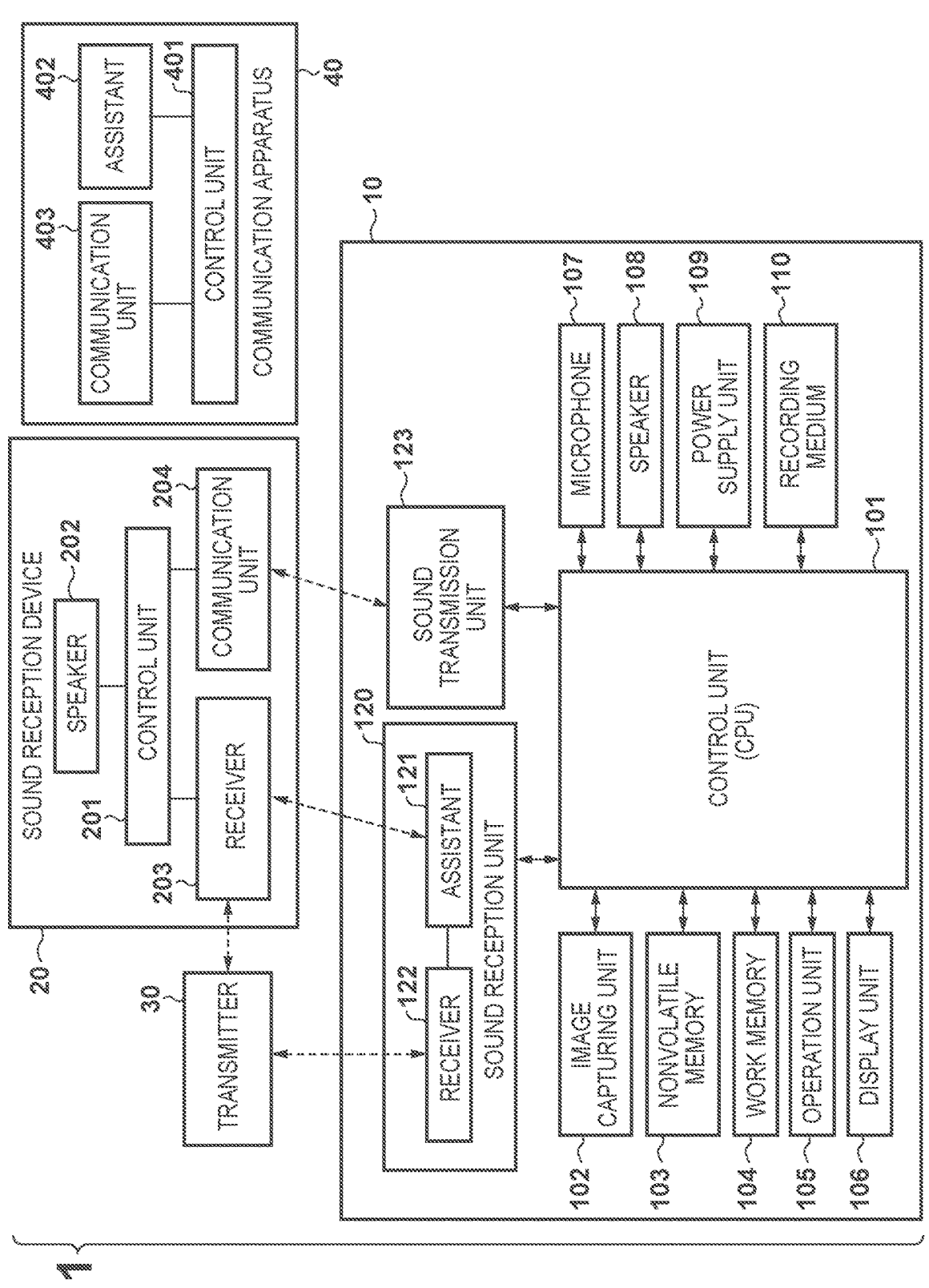
FIG. 1 is a block diagram exemplarily showing an apparatus configuration according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

General Description

The outline of a system according to the present embodiment and a problem in a shooting scene will be described first.

The system according to the present embodiment includes a transmitter, an assistant, and a receiver in AURACAST® broadcast audio (to be referred to as AURACAST® hereinafter).

The transmitter broadcasts an advertisement and transmits sound data obtained by a microphone to the receiver. The transmitter is a sound transmission device connected to or incorporated in a device including a microphone.

The assistant transmits control information to the receiver and controls such that the receiver can receive sound data from the transmitter. The assistant and the receiver are paired by wired communication or wireless communication and are provided in the same device or different devices. The assistant is provided in a portable communication apparatus or information processing apparatus such as a smartphone or a tablet computer, or an image capture apparatus such as a digital camera. The receiver is a sound reception device provided in, for example, an acoustic device such as a headphone, an earphone, or a speaker or a recording apparatus that records sound.

A problem in a shooting scene according to the present embodiment will be described here.

Figure 5:
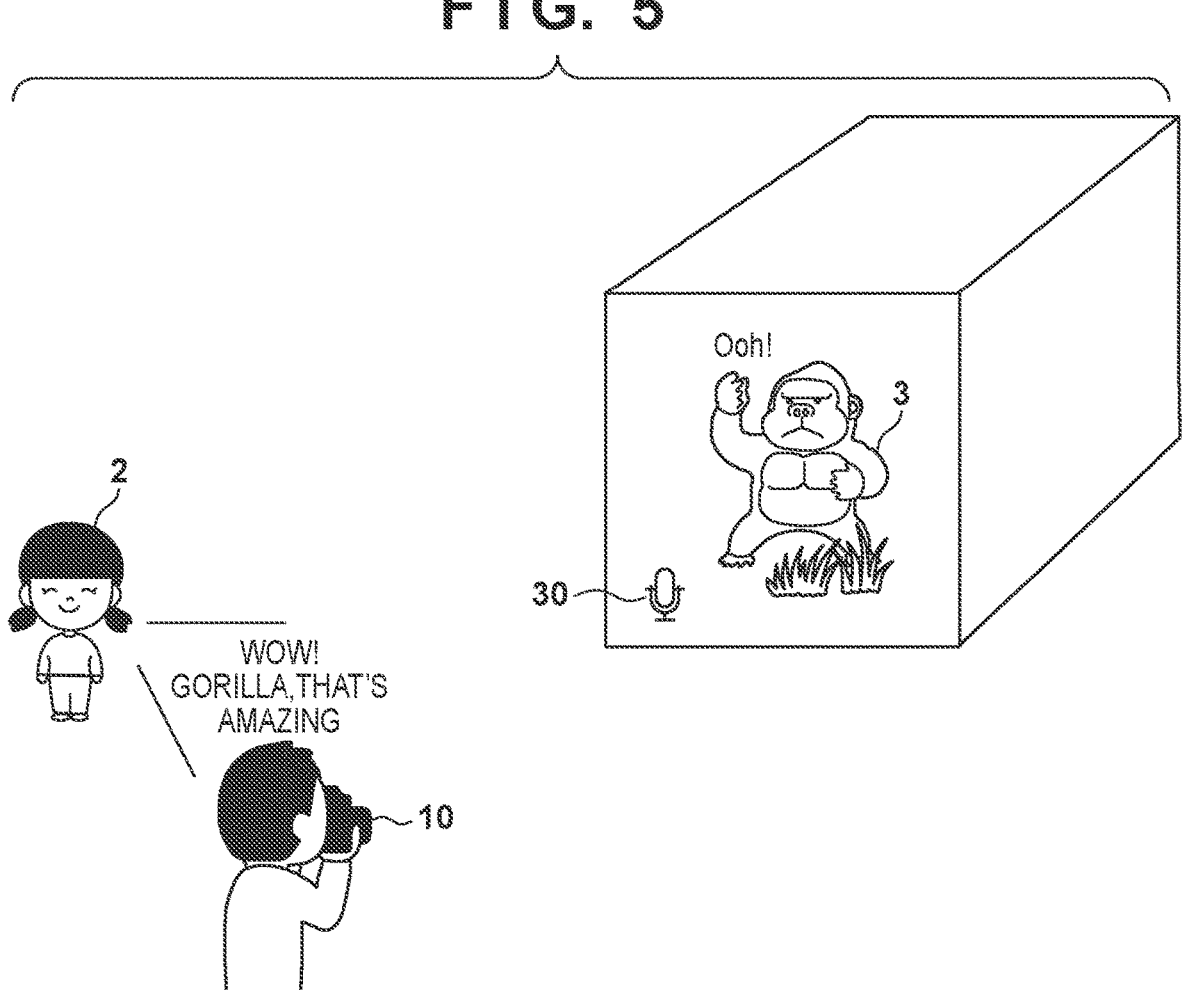
FIG. 5 is a view for explaining a problem in a shooting scene according to the present embodiment.

For example, in a zoo, as shown in FIG. 5, it can be considered that the photographer shoots a moving image by a camera 10 while receiving, from a transmitter 30, sound of a gorilla 3 that is a subject as a shooting target, or collect sound data of a person 2 on the periphery of the photographer using a microphone incorporated in the camera 10 and combines it with sound data received from the transmitter 30, or receives sound data from the transmitter 30 using a sound reception device such as an earphone or a headphone connected to the camera 10 and listens to it.

As described above, in a case where the camera and the earphone are connected, and the camera 10 or the sound reception device receives sound data from the transmitter 30, to reduce power consumption of the camera 10, for example, a method can be considered in which when the power supply of the camera 10 is on, sound data is received by the camera 10, and the sound data is transmitted from the camera 10 to the sound reception device using a communication method different from the transmitter 30, and when the power supply of the camera 10 is off, the earphone receives the sound data directly from the transmitter 30. However, every time the camera 10 is powered on or off, the user needs to operate the camera 10 or the earphone to switch connection of the transmitter 30, and there is room for improvement of operability.

In the present embodiment, connection of the transmitter 30 is automatically switched in accordance with on or off of the power supply the camera 10. More specifically, in the present embodiment, a first operation of receiving sound data from the transmitter 30 and transmitting the sound data from the camera 10 to the sound reception device and a second operation in which the sound reception device receives sound data from the transmitter 30 are switched in accordance with on or off of the power supply of the camera 10. Also, in the present embodiment, when the camera 10 is used, the camera 10 performs moving image shooting while receiving sound data from the transmitter 30, and when the camera 10 is not used, an earphone or a headphone receives sound data from the transmitter.

In the present embodiment, a digital camera will be described as an example of the electronic apparatus, but it may be a portable device such as a smartphone, a tablet terminal, a smart watch, or smart glasses, or an information processing apparatus such as a personal computer capable of performing wireless communication.

<Apparatus Configuration>

First, the configuration and the function of the camera 10 according to the present embodiment will be described with reference to FIG. 1.

A control unit 101 is a central processing unit (CPU) that comprehensively controls the entire camera 10, and implements communication processing and control processing to be described later by executing programs stored in a nonvolatile memory 103 to be described later. Note that instead controlling the entire apparatus by the control unit 101, the entire apparatus may be controlled by causing a plurality of pieces of hardware to share the processing.

An image capturing unit 102 includes a lens group including a zoom lens and a focus lens, and a shutter having an aperture function. The image capturing unit 102 also includes an image capturing element formed by a CCD or a CMOS element, which converts a subject image into an electrical signal, and an A/D converter that converts an analog image signal output from the image capturing element into a digital signal. Under the control of the control unit 101, the image capturing unit 102 converts, by the image capturing element, subject image light whose image is formed by the lenses included in the image capturing unit 102 into an electrical signal, performs noise reduction processing or the like, and outputs image data formed by a digital signal.

The control unit 101 performs resize processing such as pixel interpolation and reduction or color conversion processing for image data captured by the image capturing unit 102. Also, the control unit 101 performs compression coding using JPEG or the like for still image data that has undergone image processing, or encodes moving image data by a moving image compression method such as MPEG2 or H.264, thereby generating an image file and recording it in a recording medium 110. In addition, the control unit 101 performs predetermined arithmetic processing using captured image data, and controls the focus lens, the aperture, and the shutter of the image capturing unit 102 based on the obtained arithmetic result, thereby performing auto-focus (AF) processing or auto-exposure (AE) processing.

The nonvolatile memory 103 is an electrically erasable/recordable memory, and for example, an EEPROM or the like is used. The nonvolatile memory 103 stores constants, programs, and the like for the operation of the control unit 101. The program here is a program configured to execute control processing to be described later in the present embodiment.

A work memory 104 is used as a work area in which constants and variables for the operation of the control unit 101, and programs and the like read out from the nonvolatile memory 103 are deployed. Also, the work memory 104 is used as a buffer memory that temporarily holds image data captured by the image capturing unit 102 or an image display memory for a display unit 106.

An operation unit 105 is formed by operation members such as various kinds of switches, buttons, and dials that accept various kinds of operations from the user. The operation unit 105 includes, for example, a power button that turns on or off a power supply, a shooting button that instructs to start or end shooting of a still image or shooting of a moving image, a reproduction button that instructs reproduction of an image, and a mode switch button that changes the operation mode of the camera. The operation unit 105 also includes a dedicated connection button configured to start communication with an external apparatus such as a communication apparatus 40 to be described later. Furthermore, the operation unit 105 includes a touch panel integrated with the display unit 106 to be described later.

In a mode of shooting a still image, the control unit 101 executes auto-focus (AF) processing or auto-exposure (AE) for image data captured by the image capturing unit 102. The control unit 101 then records, in the recording medium 110, the image data output from the image capturing unit 102 when the shooting button is operated.

In a mode of shooting a moving image, the control unit 101 starts shooting processing of moving image data when the shooting button is pressed for the first time, and continues the shooting processing of the moving image data until the shooting button is pressed again. Also, the control unit 101 stops the shooting processing of the moving image data when the shooting button is pressed again, and records, in the recording medium 110, the moving image data of the time from the start to the stop of the shooting processing. Furthermore, the control unit 101 can associate sound data received from a microphone 107 incorporated in the camera 10 or the transmitter 30 during the shooting processing of the moving image data with the moving image data, and record a moving image file in the recording medium 110.

The transmitter 30 broadcasts an advertisement and transmits sound data obtained by a microphone (not shown) to a receiver 122 of the camera 10 or a receiver 203 of a sound reception device 20.

Note that sound data can also be obtained from a microphone device that is different from the microphone 107 incorporated in the camera 10 and is connected as an external apparatus to the camera 10. Note that the microphone 107 or the microphone device different from the microphone 107 outputs an analog sound signal or a digital sound signal.

The display unit 106 performs display of a live view image, display of a shot image, display of an image to be reproduced, and display of a Graphical User Interface (GUI) that accepts a user operation. The display unit 106 is, for example, a display device such as a liquid crystal display or an organic EL display. The display unit 106 may be integrated with the camera 10, or may be an external apparatus connected to the camera 10. The camera 10 need only be able to be connected to the display unit 106 and control display on the display unit 106.

A power supply unit 109 is formed by a primary battery such as an alkali battery or a lithium battery or a secondary battery such as an NiCd battery, an NiMH battery, or an Li ion battery.

The recording medium 110 records an image file generated by the control unit 101, or an image file already recorded in the recording medium 110 is read out by the control unit 101. The recording medium 110 may be a memory card or a hard disk drive attached to the camera 10, or may be a flash memory or a hard disk drive incorporated in the camera 10. The camera 10 need only be able to access at least the recording medium 110.

The camera 10 according to the present embodiment has a shooting mode of shooting image data, and a reproduction mode of reproducing an image file. In the shooting mode, image data captured by the image capturing unit 102 is displayed as a live view image on the display unit 106, and sound data received from the microphone 107 incorporated in the camera 10 or the transmitter 30 is output from a speaker 108. In the reproduction mode, an image file recorded in the recording medium 110 is read out and displayed on the display unit 106. When it is a moving image file, sound data recorded in association with the moving image data is output from the speaker 108 in synchronism with the moving image data. Note that image files recorded in the recording medium 110 are not limited to image data shot by the camera 10 and may be, for example, image data shot by an external apparatus, or image data received from an external apparatus via a sound transmission unit 123 to be described later.

A sound reception unit 120 is a wireless communication module including an assistant 121 and the receiver 122.

The assistant 121 scans an advertisement broadcast from the transmitter 30. The assistant 121 transmits control information to the receiver 122 incorporated in the camera 10 or the sound reception device 20 such as an earphone or a headphone that can be connected by wire or wirelessly to the camera 10, and controls such that the receiver 122 or the sound reception device 20 can receive sound data from the transmitter 30. The assistant 121 includes a communication interface complying with Bluetooth® or Bluetooth®-Low-Energy (to be referred to as BLE hereinafter).

The receiver 122 is paired with the assistant 121 by wired connection or wireless connection and can transmit/receive data. In the present embodiment, the receiver 122 and the assistant 121 are connected by wire. In the present embodiment, only one transmitter 30 is shown. However, the receiver 122 can scan advertisements broadcast from a plurality of transmitters and receive sound data only from one transmitter of the plurality of transmitters whose advertisements can be received by the assistant 121. The receiver 122 can receive sound data from the transmitter 30 based on the control information received from the camera 10. The receiver 122 includes a communication interface complying with Bluetooth® or BLE. The sound data received by the receiver 122 is output to the control unit 101.

The control unit 101 executes predetermined sound processing for the sound data received by the receiver 122. Then, the control unit 101 displays the image data captured by the image capturing unit 102 as a live view image on the display unit 106, and outputs the sound data from the speaker 108 in synchronism with the live view image. The photographer can thus confirm the subject as a shooting target and the sound received from the transmitter 30.

Note that in the present embodiment, the assistant 121 and the receiver 122 are separated. However, the present invention is not limited to this, and these may be integrally formed to integrate the function of the assistant 121 into the receiver 122 or reversely integrate the function of the receiver 122 into the assistant 121.

The transmitter 30 is a sound transmission device that transmits an advertisement and sound data (or a sound file). The transmitter 30 transmits sound data from an apparatus connected to the transmitter 30, an apparatus incorporating the transmitter 30, or an apparatus that records a sound file. The advertisement is a radio signal including presence and name in AURACAST®, the identification information of the transmitter, content, and a codec configuration.

The control unit 101 executes scan of the advertisement broadcast from the transmitter 30 by the assistant 121 in the sound reception unit 120.

The control unit 101 displays a transmitter whose advertisement can be received as a scan result on the display unit 106. Viewing the scan result displayed on the display unit 106, the photographer can confirm transmitters from which sound data can be received. The contents of the advertisement that the assistant 121 receives from the transmitter 30 are temporarily stored in the work memory 104.

A sound transmission unit 123 is a wireless communication module provided separately from the sound reception unit 120. The sound transmission unit 123 is wirelessly connected to a communication unit 204 of the sound reception device 20 and can transmit sound data.

The sound reception device 20 is an acoustic device such as an earphone or a headphone that can be connected by wire or wirelessly to the camera 10 and the communication apparatus 40. The sound reception device 20 includes a control unit 201, a speaker 202, the receiver 203, and the communication unit 204. The control unit 201 includes a processor (CPU) that controls the sound reception device 20, and memories (ROM and RAM). The speaker 202 outputs sound data received from the camera 10 or the transmitter 30 such that the user can listen to it. The receiver 203 is wirelessly connected to the camera 10, the transmitter 30, and the communication apparatus 40 and can receive sound data from the transmitter 30 based on control information transmitted from the assistant of the camera 10 or the assistant of the communication apparatus 40. The communication unit 204 is wirelessly connected to the sound transmission unit 123 of the camera 10 and can transmit/receive sound data and other information. The receiver 203 includes a communication interface complying with Bluetooth® or Bluetooth®-Low-Energy (to be referred to as BLE hereinafter). The communication unit 204 includes a wireless communication interface of Bluetooth®, BLE, wireless Local Area Network (LAN), 4GLTE, 5G, or the like.

The communication apparatus 40 is a smartphone or a tablet computer that can be connected by wire or wirelessly to the camera 10 and the sound reception device 20. The communication apparatus 40 includes a control unit 401, an assistant 402, a communication unit 403, and other components. Note that a description of other components of the communication apparatus 40 will be omitted.

The control unit 401 includes a processor (CPU) that controls the communication apparatus 40, and memories (ROM and RAM). The assistant 402 transmits control information to the receiver 122 of the camera 10 or the receiver 203 of the sound reception device 20 and controls such that the receiver 122 of the camera 10 or the receiver 203 of the sound reception device 20 can receive sound data from the transmitter 30. The communication unit 403 is wirelessly connected to the camera 10 or the sound reception device 20 and can transmit/receive sound data and other information. In the second embodiment to be described later, the assistant 402 of the communication apparatus 40 functions as the assistant 121 of the camera 10 or the assistant of the sound reception device 20 in place of the assistant 121 of the camera 10. Also, in the third embodiment to be described later, the assistant 402 of the communication apparatus 40 functions as the assistant of the sound reception device 20 in place of the assistant 121 of the camera 10.

The assistant 402 includes a communication interface complying with Bluetooth® or BLE. The communication unit 403 includes a wireless communication interface of Bluetooth®, BLE, wireless Local Area Network (LAN), 4GLTE, 5G, or the like.

In the present embodiment, the camera 10 or the communication apparatus 40 functions as the assistant of the camera 10 or the assistant of the sound reception device 20, thereby switching connection of the transmitter 30 to the camera 10 or the sound reception device 20 in accordance with the operation state of the camera 10. Also, in the present embodiment, connection of the transmitter 30 is switched to the camera 10 or the sound reception device 20 in accordance with on or off of the power supply of the camera 10. Furthermore, in the present embodiment, when the camera 10 is used (power on), the camera 10 can perform shooting while receiving sound data from the transmitter 30. On the other hand, when the camera 10 is not used (power off), the sound reception device 20 receives sound data from the transmitter and outputs it from the speaker 202 such that the user can listen to the sound data received from the transmitter 30.

The camera 10, the sound reception device 20, and the communication apparatus 40, which have the above-described configurations, execute control processing according to the first to third embodiments to be described later.

Note that in the following description, the camera 10, the sound reception device 20, and the communication apparatus 40 will be described as an actor of processing. In fact, processing is implemented when the control unit 101 of the camera 10, the control unit 201 of the sound reception device 20, and the control unit 401 of the communication apparatus 40 execute programs stored in the nonvolatile memory.

<Control Processing of First Embodiment>

Control processing by a camera 10 and a sound reception device 20 according to the first embodiment will be described next with reference to FIGS. 2A and 2B.

FIG. 2A shows control processing of the camera 10 and the sound reception device 20 according to the first embodiment, which is processing of switching connection of a transmitter 30 from the sound reception device 20 to the camera 10 in accordance with switching of the power supply of the camera 10 from off to on.

The processing shown in FIG. 2A is a state in which the power supply of the camera 10 is off, and a receiver 203 of the sound reception device 20 receives sound data from the transmitter 30 based on the control information of an assistant 121 of the camera 10.

In step S201, the camera 10 determines whether the power button of an operation unit 105 is turned on. The camera 10 continues the determination until it determines that the power button of the operation unit 105 is turned on, and upon determining that the power button is turned on, advances the process to step S202.

In step S202, the camera 10 instructs the sound reception device 20 to stop receiving sound data from the transmitter 30. The camera 10 transmits, from the assistant 121 of the sound reception unit 120 to the receiver 203 of the sound reception device 20, control information for instructing to stop receiving sound data from the transmitter 30. In a state in which the power supply of the camera 10 is off, the sound reception device 20 receives sound data from the transmitter 30, and the user listens to the sound data on the sound reception device 20. In this state, when the power supply of the camera 10 is turned on, it is considered that the photographer wants to receive, by the camera 10, the sound data from the transmitter 30 and record it together with a shot moving image. Note that sound data to be recorded at the time of moving image shooting may be sound data obtained by combining sound data received from the transmitter 30 with sound data of the microphone 107 provided in the camera 10. In a case where sound data received from the transmitter 30 and sound data of a microphone 107 provided in the camera 10 are combined, it is considered that the user wants to listen to the sound data to be recorded. Hence, the sound data is transmitted from the camera 10 to the sound reception device 20 such that the user can listen to the sound data on the sound reception device 20. In step S202, the sound reception device 20 stops receiving sound data from the transmitter 30. In this case, since the assistant 121 of a sound reception unit 120 provides the functions of the assistant of the sound reception device 20, a sound data reception stop instruction is transmitted from the assistant 121 of the camera 10 to the receiver 203 of the sound reception device 20.

In step S203, upon receiving the sound data reception stop instruction from the camera 10, the sound reception device 20 stops receiving sound data from the transmitter 30.

In step S204, the camera 10 cancels the function of the assistant of the sound reception device 20, which is provided by the assistant 121 of the sound reception unit 120. Then, the assistant 121 of the sound reception unit 120 controls a receiver 122 such that the camera 10 can receive sound data from the transmitter 30. Note that when the assistant 121 of the camera 10 provides the functions of the assistants of a plurality of apparatuses, the function of the assistant of the sound reception device 20 may not be canceled. The function of the assistant may be provided by a component different from the assistant 121.

In step S205, the camera 10 starts the function of the assistant of the camera 10 such that the assistant 121 of the sound reception unit 120 controls the receiver 122.

In step S206, the camera 10 transmits, from the assistant 121 of the sound reception unit 120 to the receiver 122, control information for instructing to start receiving sound data from the transmitter 30.

In step S207, in the camera 10, the receiver 122 of the sound reception unit 120 receives sound data from the transmitter 30.

In step S208, in the camera 10, a sound transmission unit 123 is wirelessly connected to a communication unit 204 of the sound reception device 20. Note that the wireless connection method between the sound transmission unit 123 of the camera 10 and the communication unit 204 of the sound reception device 20 may be any communication method such as Bluetooth®, BLE, or wireless LAN.

In step S209, the camera 10 transmits sound data from the sound transmission unit 123 to the communication unit 204 of the sound reception device 20. The sound data transmitted to the sound reception device 20 may be sound data to be transmitted to the sound reception device 20, sound data obtained by the microphone 107, or sound data obtained by combining sound data received from the transmitter 30 with sound data of the microphone 107.

In step S210, in the sound reception device 20, the communication unit 204 starts receiving sound data from the camera 10. The sound reception device 20 outputs, from a speaker or the like, the sound data received from the camera 10 such that the user can listen to it.

FIG. 2B shows control processing of the camera 10 and the sound reception device 20 according to the first embodiment, which is processing of switching connection of the transmitter 30 from the camera 10 to the sound reception device 20 in accordance with switching of the power supply of the camera 10 from on to off.

The processing shown in FIG. 2B is a state in which the power supply of the camera 10 is on, the receiver 122 of the camera 10 receives sound data from the transmitter 30, and the sound data is transmitted from the camera 10 to the sound reception device 20.

In step S221, the camera 10 determines whether the power button of the operation unit 105 is turned off. The camera 10 continues the determination until it determines that the power button of the operation unit 105 is turned off, and upon determining that the power button is turned off, advances the process to step S222.

In step S222, in the camera 10, the sound transmission unit 123 stops transmitting sound data to the sound reception device 20. When the power supply of the camera 10 is on, the sound data received from the camera 10 is made listenable on the sound reception device 20. On the other hand, when the power supply of the camera 10 is off, the sound reception device 20 receives sound data from the transmitter 30. This aims at suppressing power consumption of the camera 10 to minimum because when the power supply of the camera 10 is off, it is obvious that the user has no will to shoot a moving image. When sound data is transmitted from the camera 10 to the sound reception device 20 even though moving image shooting is not performed, power of the battery is wastefully consumed. Hence, in step S222, transmission of sound data from the camera 10 to the sound reception device 20 is stopped.

In step S223, the sound reception device 20 stops receiving sound data from the camera 10. The sound reception device 20 stops receiving sound data from the camera 10 upon receiving a sound data reception stop instruction from the camera 10 or upon determining that sound data is not transmitted from the camera 10.

In step S224, the camera 10 stops reception of sound data from the transmitter 30 by the receiver 122 of the sound reception unit 120. The assistant 121 of the sound reception unit 120 transmits, to the receiver 122, control information for instructing to stop receiving sound data from the transmitter 30.

In step S225, in the camera 10, upon receiving the control information from the assistant 121, the receiver 122 of the sound reception unit 120 stops receiving sound data from the transmitter 30.

In step S226, the camera 10 cancels the function of the assistant of the camera 10, which is provided by the assistant 121 of the sound reception unit 120. Then, the assistant 121 of the sound reception unit 120 controls the receiver 203 of the sound reception device 20 to allow the sound reception device 20 to receive sound data from the transmitter 30. Note that when the assistant 121 of the camera 10 provides the functions of the assistants of a plurality of apparatuses, the function of the assistant need not be canceled. Also, the function of the assistant may be provided by a component different from the assistant 121.

In step S227, the camera 10 starts the function of the assistant of the sound reception device 20 such that the assistant 121 of the sound reception unit 120 controls the receiver 203 of the sound reception device 20. A wireless communication module or a microcomputer different from the assistant 121 may control as an assistant.

In step S228, the camera 10 transmits, from the assistant 121 of the sound reception unit 120 to the receiver 203 of the sound reception device 20, control information for instructing to start receiving sound data from the transmitter 30.

In step S229, in the sound reception device 20, the receiver 203 starts receiving sound data from the transmitter 30. The sound reception device 20 outputs, from a speaker or the like, the sound data received from the transmitter 30 such that the user can listen to it.

According to the first embodiment, connection of the transmitter 30 is switched to the camera 10 or the sound reception device 20 in accordance with on or off of the power supply of the camera 10. More specifically, the operations of the camera 10 and the sound reception device 20 are switched such that when the power supply of the camera 10 is on, the camera 10 receives sound data from the transmitter 30, and when the power supply of the camera 10 is off, the sound reception device 20 receives sound data from the transmitter 30. This makes it possible to improve operability when switching connection of the transmitter 30 and reduce power consumption of the camera 10.

Also, connection of the transmitter 30 is switched to the camera 10 or the sound reception device 20 in accordance with the operation state of the operation unit 105 of the camera 10. However, control may be done in accordance with a component different from the operation unit 105.

<Control Processing of Second Embodiment>

Control processing by a camera 10, a sound reception device 20, and a communication apparatus 40 according to the second embodiment will be described next with reference to FIGS. 3A and 3B.

In the second embodiment, the communication apparatus 40 provides the functions of the assistant of the camera 10 and the assistant of the sound reception device 20. Connection of a transmitter 30 is switched based on control information that the camera 10 and the sound reception device 20 receive from an assistant 402 of the communication apparatus 40.

FIG. 3A shows control processing of the camera 10, the sound reception device 20, and the communication apparatus 40 according to the second embodiment, which is processing of switching connection of the transmitter 30 from the sound reception device 20 to the camera 10 in accordance with switching of the power supply of the camera 10 from off to on.

The processing shown in FIG. 3A is a state in which the power supply of the camera 10 is off, and a receiver 203 of the sound reception device 20 receives sound data from the transmitter 30 based on the control information of the assistant 402 of the communication apparatus 40.

This is also a state in which the camera 10 and the communication apparatus 40 are paired (wirelessly connected) such that the communication apparatus 40 can receive an operation instruction from the camera 10.

In step S301, the camera 10 determines whether the power button of an operation unit 105 is turned on. The camera 10 continues the determination until it determines that the power button of the operation unit 105 is turned on, and upon determining that the power button is turned on, advances the process to step S302.

In step S302, the camera 10 transmits operation instructions (1) and (2) below to the communication apparatus 40.

(1) Reception of sound data from the transmitter 30 by the sound reception device 20 is stopped.

(2) The camera 10 starts receiving sound data from the transmitter 30.

In the second embodiment, when the power supply of the camera 10 is off, the sound reception device 20 receives sound data from the transmitter 30, as in the first embodiment. On the other hand, when the power supply of the camera 10 is on, the camera 10 receives sound data from the transmitter 30, and sound data obtained by combining this with sound data obtained by a microphone 107 is transmitted to the sound reception device 20 as needed.

The communication apparatus 40 functions as the assistant of the camera 10 and the assistant of the sound reception device 20. However, the communication apparatus 40 may determine the power supply state of the camera 10 based on information received from the camera 10 and execute control of the camera 10 and the sound reception device 20.

When the power supply of the camera 10 is off, the sound reception device 20 receives sound data from the transmitter 30. On the other hand, when the power supply of the camera 10 is on, the camera 10 receives sound data from the transmitter 30, and transmits sound data obtained by combining this with sound data obtained by the microphone 107 to the sound reception device 20 as needed.

In step S303, the communication apparatus 40 receives, from the camera 10, an instruction to stop reception of sound data from the transmitter 30 by the sound reception device 20 and transmits, to the receiver 203 of the sound reception device 20, control information for instructing to stop receiving sound data from the transmitter 30.

In step S304, upon receiving, from the communication apparatus 40, the instruction to stop reception of sound data from the transmitter 30, the receiver 203 of the sound reception device 20 stops receiving sound data from the transmitter 30.

In step S305, the communication apparatus 40 cancels the function of the assistant of the sound reception device 20. Then, an assistant 402 of the communication apparatus 40 controls, as the assistant of the camera 10, a receiver 122 of the sound reception unit 120 of the camera 10 such that the camera 10 can receive sound data from the transmitter 30. Note that when the communication apparatus 40 provides the functions of the assistants of a plurality of apparatuses, the function of the assistant of the sound reception device 20 may not be canceled.

In step S306, the communication apparatus 40 starts the function of the assistant of the camera 10 such that the assistant 402 controls the receiver 122 of the camera 10.

In step S307, in the communication apparatus 40, the assistant 402 transmits, to the receiver 122 of the camera 10, control information for instructing to start receiving sound data from the transmitter 30.

The processing of steps S308 to S311 are the same as the processing of steps S207 to S210 in FIG. 2.

FIG. 3B shows control processing of the camera 10, the sound reception device 20, and the communication apparatus 40 according to the second embodiment, which is processing of switching connection of the transmitter 30 from the camera 10 to the sound reception device 20 in accordance with switching of the power supply of the camera 10 from on to off.

The processing shown in FIG. 3B is a state in which the power supply of the camera 10 is on, the receiver 122 of the camera 10 receives sound data from the transmitter 30 upon receiving control information of the assistant 402 of the communication apparatus 40, and the sound data is transmitted from the camera 10 to the sound reception device 20.

Steps S321 to S323 are the same as steps S221 to S223 in FIG. 2B.

In step S324, in the camera 10, the sound transmission unit 123 disconnects pairing with the communication unit 204 of the sound reception device 20. This is to allow the sound reception device 20 to be paired with the communication apparatus 40 and receive sound data from the transmitter 30. Note that when the sound reception device 20 can be paired with a plurality of apparatuses, and the communication apparatus 40 can control sound data reception of the camera 10 even when the sound reception device 20 is paired with the camera 10, pairing between the camera 10 and the sound reception device 20 need not be canceled.

In step S325, the camera 10 transmits operation instructions (1) and (2) below to the communication apparatus 40.

(1) Reception of sound data from the transmitter 30 by the camera 10 is stopped.

(2) The sound reception device 20 starts receiving sound data from the transmitter 30.

In step S326, the communication apparatus 40 receives, from the camera 10, an instruction to stop reception of sound data from the transmitter 30 by the camera 10 and transmits, to the receiver 122 of the camera 10, control information for instructing to stop receiving sound data from the transmitter 30. To control reception of sound data from the transmitter 30, an assistant is necessary. Hence, even when the camera 10 determines that the camera 10 should receive sound data from the transmitter 30, the camera 10 cannot directly perform control, and needs to be controlled by the assistant 402 of the communication apparatus 40.

In step S327, in the camera 10, the receiver 122 of the sound reception unit 120 receives, from the assistant 402 of the communication apparatus 40, control information for instructing to stop reception of sound data from the transmitter 30, and the receiver 122 of the sound reception unit 120 stops receiving sound data from the transmitter 30.

In step S328, the communication apparatus 40 cancels the function of the assistant of the camera 10. This is to allow the communication apparatus 40 to start the function of the assistant of the sound reception device 20 and allow the sound reception device 20 to receive sound data from the transmitter 30. Note that when the communication apparatus 40 can provide the functions of the assistants of a plurality of apparatuses, the function of the assistant of the camera 10 may not be canceled.

In step S329, the communication apparatus 40 starts the function of the assistant of the sound reception device 20 to control the receiver 203 of the sound reception device 20.

In step S330, the communication apparatus 40 transmits, to the receiver 203 of the sound reception device 20, control information for instructing to start receiving sound data from the transmitter 30.

In step S331, in the sound reception device 20, the receiver 203 starts receiving sound data from the transmitter 30. The sound reception device 20 outputs, from a speaker or the like, the sound data received from the transmitter 30 such that the user can listen to it.

According to the second embodiment, in addition to the effect of the first embodiment, the communication apparatus 40 provides the functions of the assistants of the camera 10 and the sound reception device 20, thereby reducing power consumption of the camera 10 as compared to a case where the camera 10 is caused to function as the assistant.

<Control Processing of Third Embodiment>

Control processing by a camera 10, a sound reception device 20, and a communication apparatus 40 according to the third embodiment will be described next with reference to FIGS. 4A and 4B.

In the third embodiment, the camera 10 and the communication apparatus 40 share the function of an assistant. Control of the camera 10 is performed by an assistant 121 of the camera 10, and control of the sound reception device 20 is performed by an assistant 402 of the communication apparatus 40.

FIG. 4A shows control processing of the camera 10, the sound reception device 20, and the communication apparatus 40 according to the third embodiment, which is processing of switching connection of a transmitter 30 from the sound reception device 20 to the camera 10 in accordance with switching of the power supply of the camera 10 from off to on.

The processing shown in FIG. 4A is a state in which the power supply of the camera 10 is off, and a receiver 203 of the sound reception device 20 receives sound data from the transmitter 30 based on the control information of the assistant 402 of the communication apparatus 40.

Also, the camera 10 and the communication apparatus 40 are paired (wirelessly connected) such that the communication apparatus 40 can receive an operation instruction from the camera 10.

In step S401, the camera 10 determines whether the power button of an operation unit 105 is turned on. The camera 10 continues the determination until it determines that the power button of the operation unit 105 is turned on, and upon determining that the power button is turned on, advances the process to step S402.

In step S402, the camera 10 transmits an operation instruction below to the communication apparatus 40.

Reception of sound data from the transmitter 30 by the sound reception device 20 is stopped.

In the third embodiment, as in the first and second embodiments, when the power supply of the camera 10 is off, the sound reception device 20 receives sound data from the transmitter 30. On the other hand, when the power supply of the camera 10 is on, the camera 10 receives sound data from the transmitter 30, and sound data obtained by combining this with sound data obtained by a microphone 107 is transmitted to the sound reception device 20 as needed.

The assistant 402 of the communication apparatus 40 controls, as the assistant of the sound reception device 20, reception of sound data from the transmitter 30 by the sound reception device 20. Also, the assistant 121 of the camera 10 controls, as the assistant of the camera 10, reception of sound data from the transmitter 30 by the camera 10. Note that the communication apparatus 40 may determine the power supply state of the camera 10 based on information received from the camera 10 and execute control of the camera 10 or the sound reception device 20.

In step S403, the communication apparatus 40 receives, from the camera 10, an instruction to stop reception of sound data from the transmitter 30 by the sound reception device 20 and the assistant 402 transmits, to the receiver 203 of the sound reception device 20, control information for instructing to stop receiving sound data from the transmitter 30.

In step S404, upon receiving, from the communication apparatus 40, the instruction to stop reception of sound data from the transmitter 30, the receiver 203 of the sound reception device 20 stops receiving sound data from the transmitter 30.

In step S405, the communication apparatus 40 notifies the camera 10 that the stop of reception of sound data from the transmitter 30 by the sound reception device 20 is completed.

In step S406, the camera 10 receives, from the communication apparatus 40, the notification indicating that the stop of reception of sound data from the transmitter 30 by the sound reception device 20 is completed.

Steps S407 to S412 are the same as steps S205 to S210 in FIG. 2.

FIG. 4B shows control processing of the camera 10, the sound reception device 20, and the communication apparatus 40 according to the third embodiment, which is processing of switching connection of the transmitter 30 from the camera 10 to the sound reception device 20 in accordance with switching of the power supply of the camera 10 from on to off.

The processing shown in FIG. 4B is a state in which the power supply of the camera 10 is on, the receiver 122 of the camera 10 receives sound data from the transmitter 30 based on the control information of the assistant 121, and the sound data is transmitted from the camera 10 to the sound reception device 20.

Steps S421 to S423 are the same as steps S221 to S223 in FIG. 2.

In step S424, in the camera 10, the sound transmission unit 123 disconnects pairing with the communication unit 204 of the sound reception device 20. This is to allow the sound reception device 20 to be paired with the communication apparatus 40 and receive sound data from the transmitter 30. Note that when the sound reception device 20 can be paired with a plurality of apparatuses, and the communication apparatus 40 can control sound data reception of the camera 10 even when the sound reception device 20 is paired with the camera 10, pairing between the camera 10 and the sound reception device 20 need not be canceled.

Steps S425 to S427 are the same as steps S224 to S226 in FIG. 2.

In step S428, the camera 10 transmits an operation instruction below to the communication apparatus 40.

The communication apparatus 40 starts the function of the assistant of the sound reception device 20.

In step S429, in the communication apparatus 40, the assistant 402 starts the function of the assistant of the sound reception device 20 to control the receiver 203 of the sound reception device 20. Note that when the assistant 402 of the communication apparatus 40 has already started the function of the assistant of the sound reception device 20, this processing is unnecessary.

In step S430, in the communication apparatus 40, the assistant 402 transmits, to the receiver 203 of the sound reception device 20, control information for instructing to start receiving sound data from the transmitter 30.

In step S431, in the sound reception device 20, the receiver 203 starts receiving sound data from the transmitter 30. The sound reception device 20 outputs, from a speaker or the like, the sound data received from the transmitter 30 such that the user can listen to it.

According to the third embodiment, in addition to the effects of the first and second embodiments, the camera 10 and the communication apparatus 40 share the function of the assistant. Control of the camera 10 is performed by the assistant 121 of the camera 10, and control of the sound reception device 20 is performed by the assistant 402 of the communication apparatus 40. When the power supply of the camera 10 is on, the camera 10 need only be operated, and when the power supply of the camera 10 is off, the communication apparatus 40 need only be operated. Hence, operability improves.

Note that in the first to third embodiments, connection of the transmitter 30 is switched to the camera 10 or the sound reception device 20 in accordance with on or off of the power supply of the camera 10. However, connection of the transmitter 30 may be switched to the camera 10 or the sound reception device 20 in accordance with information other than the power supply state of the camera 10. For example, connection of the transmitter 30 may be switched to the camera 10 or the sound reception device 20 in accordance with the operation mode of the camera 10. In this case, the operation mode of the camera 10 includes, for example, a moving image shooting mode or a still image shooting mode, a sound combining mode or a sound non-combining mode, a power saving mode or an operation mode other than the power saving mode. In this case, the operation in the power-on state of the camera 10 is performed in the moving image shooting mode, the sound combining mode, or a mode other than the power saving mode, and the operation in the power-off state of the camera 10 is performed in the still image shooting mode, the sound non-combining mode, or the power saving mode.

OTHER EMBODIMENT

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-060832, filed Apr. 4, 2023 which is hereby incorporated by reference herein in its entirety.

What is claimed is:

1. An electronic apparatus comprising:

a sound reception unit that receives sound data from a sound transmission device by a wireless communication unit;

a sound transmission unit that transmits sound data to a sound reception device by a wireless communication unit; and a control unit that switches, in accordance with an operation state of the electronic apparatus, between a first operation of receiving the sound data from the sound transmission device and transmitting the sound data to the sound reception device by the sound transmission unit and a second operation in which the sound reception device receives the sound data from the sound transmission device.

2. The apparatus according to claim 1, wherein when the electronic apparatus switches from a first state to a second state, the control unit stops the second operation and executes the first operation, and when the electronic apparatus switches from the second state to the first state, the control unit stops the first operation and executes the second operation.

3. The apparatus according to claim 1, wherein the electronic apparatus and the sound reception device communicate with a communication apparatus, the communication apparatus controls the electronic apparatus and the sound reception device to switch between the first operation and the second operation, and the control unit instructs the communication apparatus to switch between the first operation and the second operation in accordance with the operation state of the electronic apparatus.

4. The apparatus according to claim 3, wherein when the electronic apparatus switches from a first state to a second state, the electronic apparatus controls such that the sound reception device stops the second operation, and the electronic apparatus executes the first operation, and when the electronic apparatus switches from the second state to the first state, the electronic apparatus controls such that the electronic apparatus stops the first operation, and the sound reception device executes the second operation.

5. The apparatus according to claim 1, wherein the electronic apparatus and the sound reception device communicate with a communication apparatus, the control unit controls the first operation, and instructs the communication apparatus to switch between the first operation and the second operation in accordance with the operation state of the electronic apparatus, and the communication apparatus controls the second operation in accordance with the instruction.

6. The apparatus according to claim 5, wherein when the electronic apparatus switches from a first state to a second state, the control unit instructs the communication apparatus such that the sound reception device stops the second operation, and controls such that the electronic apparatus executes the first operation, and when the electronic apparatus switches from the second state to the first state, the control unit controls such that the electronic apparatus stops the first operation, and instructs the communication apparatus such that the sound reception device executes the second operation.

7. The apparatus according to claim 2, wherein the first state is a state in which a power supply of the electronic apparatus is off, and the second state is a state in which the power supply of the electronic apparatus is on.

8. The apparatus according to claim 2, wherein the first state is a power saving mode, and the second state is an operation mode other than the power saving mode.

9. The apparatus according to claim 2, further comprising an image capturing unit that captures an image, wherein the first state is a still image shooting mode, and the second state is a moving image shooting mode.

10. The apparatus according to claim 2, wherein the first state is a mode in which the sound data received from the sound transmission device and the sound data obtained by a microphone provided in the electronic apparatus are not combined, and the second state is a mode in which the sound data are combined.

11. The apparatus according to claim 1, wherein the sound reception unit includes a first wireless communication unit, the sound transmission unit includes a second wireless communication unit different from the first wireless communication unit, the sound transmission device is a transmitter in AURA-CAST® broadcast audio, the sound reception device is a receiver in AURACAST® broadcast audio, and the sound reception unit includes an assistant and a receiver in AURACAST® broadcast audio.

* * * * *